(12) United States Patent (10) Patent No.: US 8,382,947 B2
Skaggs et al. (45) Date of Patent: *Feb. 26, 2013

(54) SURFACE TREATMENT OF SUBSTRATE OR PAPER/PAPERBOARD PRODUCTS USING OPTICAL BRIGHTENING AGENT

(75) Inventors: Benny J Skaggs, Springboro, OH (US); Matt Bovee, Morrow, OH (US)

(73) Assignee: International Paper Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,714

(22) Filed: Jun. 17, 2011

(65) Prior Publication Data

US 2012/0003490 A1 Jan. 5, 2012

Related U.S. Application Data

(63) Continuation of application No. 12/623,950, filed on Nov. 23, 2009, now Pat. No. 7,972,477, which is a continuation of application No. 11/445,422, filed on Jun. 1, 2006, now Pat. No. 7,622,022.

(51) Int. Cl.
*D21H 11/00* (2006.01)
(52) U.S. Cl. ...................................................... 162/162
(58) Field of Classification Search .................. 162/162, 162/135, 175, 202; 510/394; 8/684
See application file for complete search history.

(56) References Cited

U.S. PATENT DOCUMENTS

| | | |
|---|---|---|
| 3,293,114 A | 12/1966 | Kenaga et al. |
| 3,533,908 A | 10/1970 | Hoogsteen |
| 3,556,934 A | 1/1971 | Meyer |
| 4,022,965 A | 5/1977 | Goheen et al. |
| 4,040,900 A | 8/1977 | Mazzarella et al. |
| 4,075,136 A | 2/1978 | Schaper |
| 4,133,688 A | 1/1979 | Sack |
| 4,166,894 A | 9/1979 | Schaper |
| 4,169,810 A | 10/1979 | Gunther et al. |
| 4,174,417 A | 11/1979 | Rydell |
| 4,264,325 A | 4/1981 | Meyer et al. |
| 4,279,794 A | 7/1981 | Dumas |
| 4,431,481 A | 2/1984 | Drach et al. |
| 4,483,889 A | 11/1984 | Andersson |
| 4,496,427 A | 1/1985 | Davison |
| 4,986,882 A | 1/1991 | Mackey et al. |
| 5,049,235 A | 9/1991 | Barcus et al. |
| 5,125,996 A | 6/1992 | Campbell et al. |
| 5,160,789 A | 11/1992 | Barcus et al. |
| 5,209,953 A | 5/1993 | Grupe et al. |
| 5,266,250 A | 11/1993 | Kroyer |
| 5,360,420 A | 11/1994 | Cook et al. |
| 5,443,899 A | 8/1995 | Barcus et al. |
| 5,482,514 A | 1/1996 | von Raven |
| 5,514,429 A | 5/1996 | Kamihgaraguchi et al. |
| 5,531,728 A | 7/1996 | Lash |
| 5,662,773 A | 9/1997 | Frederick et al. |
| 5,667,637 A | 9/1997 | Jewell et al. |
| 5,698,074 A | 12/1997 | Barcus et al. |
| 5,698,688 A | 12/1997 | Smith et al. |
| H1704 H | 1/1998 | Wallajapet et al. |
| 5,731,080 A | 3/1998 | Cousin et al. |
| 5,873,913 A | 2/1999 | Cowman et al. |
| 5,902,454 A | 5/1999 | Nelson |
| 6,030,443 A | 2/2000 | Bock et al. |
| 6,146,494 A | 11/2000 | Seger et al. |
| 6,207,258 B1 | 3/2001 | Varnell |
| 6,361,651 B1 | 3/2002 | Sun |
| 6,426,382 B1 | 7/2002 | Farrar et al. |
| 6,471,824 B1 | 10/2002 | Jewell |
| 6,506,282 B2 | 1/2003 | Hu et al. |
| 6,579,414 B2 | 6/2003 | Jewell |
| 6,579,415 B2 | 6/2003 | Jewell |
| 6,582,557 B2 | 6/2003 | Jewell |
| 6,592,712 B2 | 7/2003 | Koukoulas et al. |
| 6,592,717 B2 | 7/2003 | Jewell |
| 6,723,846 B1 | 4/2004 | Metzger et al. |
| 6,764,726 B1 | 7/2004 | Yang et al. |
| 6,773,549 B1 | 8/2004 | Burkhardt |
| 6,802,938 B2 | 10/2004 | Mohan et al. |
| 6,818,101 B2 | 11/2004 | Vinson et al. |
| 6,864,529 B2 | 3/2005 | Mei et al. |
| 6,890,454 B2 | 5/2005 | Farrar et al. |
| 6,893,473 B2 | 5/2005 | Neogi et al. |
| 6,936,138 B2 | 8/2005 | Attenberger et al. |
| 6,994,734 B2 | 2/2006 | Yamaguchi et al. |
| 7,381,300 B2 | 6/2008 | Skaggs et al. |
| 7,553,395 B2 | 6/2009 | Stoffel et al. |
| 7,622,022 B2 | 11/2009 | Skaggs et al. |
| 7,641,765 B2 | 1/2010 | Blum et al. |
| 7,682,438 B2 | 3/2010 | Song et al. |
| 7,972,477 B2 | 7/2011 | Skaggs et al. |
| 2003/0013628 A1 | 1/2003 | Farrar et al. |
| 2004/0014910 A1 | 1/2004 | Wang |
| 2004/0016528 A1 | 1/2004 | Varnell |
| 2005/0133184 A1 | 6/2005 | Dourgherty et al. |
| 2006/0005935 A1 | 1/2006 | Harris et al. |
| 2007/0087134 A1 | 4/2007 | Tyan et al. |
| 2007/0113998 A1 | 5/2007 | Park |

(Continued)

FOREIGN PATENT DOCUMENTS

DE 19945580 4/2001
EP 0629741 12/1994

(Continued)

OTHER PUBLICATIONS

G.A. Smook, Handbook for Pulp and Paper Technologists, 2nd edition, 1992 pp. 38-41, 45 (including Table 4-7, and 46-65, pp. 273-278, pp. 283-285, pp. 289-292.

(Continued)

*Primary Examiner* — Mark Halpern
(74) *Attorney, Agent, or Firm* — Thomas W. Barnes, III; Eric W. Guttag (57) ABSTRACT

The present invention relates to a process for applying optical brightening agent (OBA) to a sheet of paper or paperboard substrate. The process comprises the step of spraying an aqueous composition comprising an optical brightening agent onto at least one surface of a sized paperboard substrate to form a treated paperboard substrate. The treated paperboard substrate includes a layer of OBA on at least one surface of the paper or paperboard substrate in which the brightness of the treated paper or paperboard substrate is greater than the sized paper or paperboard substrate before treating thereof.

15 Claims, 5 Drawing Sheets

U.S. PATENT DOCUMENTS

| | | |
|---|---|---|
| 2007/0125267 A1 | 6/2007 | Song et al. |
| 2008/0017337 A1 | 1/2008 | Dugirals et al. |
| 2009/0317549 A1 | 12/2009 | Tan et al. |
| 2010/0129553 A1 | 5/2010 | Jackson et al. |

FOREIGN PATENT DOCUMENTS

| | | |
|---|---|---|
| EP | 0666368 | 8/1995 |
| GB | 786543 | 11/1957 |
| GB | 903416 | 8/1962 |
| GB | 1373788 | 11/1974 |
| GB | 1533434 | 11/1978 |
| GB | 2307487 | 5/1997 |
| GB | 2357777 | 7/2001 |
| WO | WO9600221 | 1/1996 |

OTHER PUBLICATIONS

Strazdins The Sizing of Paper 2nd edition, W.F.Renolds, 1989, pp. 1-31.

SURFACE TREATMENT OF SUBSTRATE OR PAPER/PAPERBOARD PRODUCTS USING OPTICAL BRIGHTENING AGENT

FIELD OF THE INVENTION

The present invention relates to a method and apparatus for applying optical brightening agent widely known as (OBA) on a paper surface by a spray coating device.

BACKGROUND OF THE INVENTION

The quality of paper or paperboard can be improved by, among other ways, treating the surface of a paper or paperboard web with a suitable chemical agent. As market demands require paper to exhibit higher levels of brightness, optical whitener or optical brightening agent (OBA), is added at exorbitant amounts to increase the amount of light reflectance, or brightness measured in a sheet. The OBA works by absorbing UV light and re-emitting it at visible light wavelengths, measured in a specified reflective range. In these applications, the starch acts as a UV light filter when it is yellow colored, and prevents complete activation of the OBA molecule for its intended purpose of increasing brightness.

SUMMARY OF THE INVENTION

The present invention is directed to allow optical whitener or brightener the opportunity to act as efficiently as possible when added to a sheet of paper or paperboard. Accordingly, in present invention an OBA is applied directly to the surface of a paper by spray application which allows the OBA molecule to reside closer to the human eye (or measuring device) thereby permitting nothing to interfere with the light that is reflected back. This technique permits the OBA to act in its most efficient form as possible.

One aspect of the present invention reduces the amount of OBA sprayed onto the surface of the paper as compared with conventional size press or wet end method of using mixture of starch and OBA at the size press to obtain comparable levels of brightness through use of the present invention. When OBA is sprayed onto the paper surface, the human eye averages the area it observes and arrives at an image. Measurements have been made on sprayed samples and size press OBA samples and the results compared for measurement variability to determine if there were measurable fluctuations in brightness.

Another aspect of the present invention is to make immediate adjustments to brightness of a standard substrate at a spray nozzle instead of waiting for the OBA added to either the paper wet end or the size press system to equilibrate when OBA levels are modified. A further aspect of the present invention is the removal of OBA from already complex size press and coating formulations.

Another further aspect of the present invention relates to a process for applying optical brightening agent (OBA) to a sheet of paper, paperboard, substrate, linerboard, and other cellulose fibers. The process comprises the step of spraying an aqueous composition comprising an optical brightening agent onto at least one surface of a paper or related substrate to form a treated substrate. The treated substrate includes a layer of OBA on at least one surface of the substrate in which the brightness of the treated substrate is greater than the substrate before treating thereof.

Yet another aspect of the present invention relates to a paper or paperboard comprising a substrate having a layer of starch being coated thereto wherein the layer of starch including a layer of optical brightening agent (OBA) sprayed thereon. A layer of an aqueous composition comprises an optical brightening agent (OBA) being sprayed onto at least one surface of the substrate which the brightness of the treated substrate is greater than the substrate before treating thereof.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

While this invention is susceptible of embodiment in many different forms, there is shown and described in drawing, figures, and examples and will herein be described in detail preferred embodiments of the invention with the understanding that the present disclosure is to be considered as an exemplification of the principles of the invention and is not intended to limit the broad aspect of the invention to the embodiments illustrated.

In the first step of the process of this invention, any cellulose fibers used to make a paper, paperboard, substrate or linerboard is treated with a treating composition comprising one or more optical brightening agents (OBAs) to enhance the surface brightness of a paper. Although, paper is treated in the present invention, but any cellulose fibers such as paper web, paperboard, substrate, and linerboard can be used in the practice of this invention. Such paper or related webs their methods and apparatus and their manufacture are well known in the art (e.g., G. A. Smook reference book cited herein). For example, the paper or paperboard web can be made from pulp fibers derived from hardwood trees, softwood trees, or alternatively, a combination of hardwood and softwood trees is prepared for use in a papermaking furnish by any known suitable digestion, refining, and bleaching operations, as for example, known mechanical, thermomechanical, chemical and semichemical, etc., pulping and other well known pulping processes. In certain embodiments, at least a portion of the pulp fibers may be provided from non-woody herbaceous plants including, but not limited to, kenaf, hemp, jute, flax, sisal, or abaca although legal restrictions and other considerations may make the utilization of hemp and other fiber sources impractical or impossible. Either bleached or unbleached pulp fiber may be utilized in the process of this invention. Recycled pulp fibers are also suitable for use. In the preferred embodiment, the cellulosic fibers in the paper or related web include from about 0% to about 100% by weight dry basis softwood fibers and from about 100% to about 0% by weight dry basis hardwood fibers.

In the preferred embodiments of the invention, in addition to pulp fibers and optional additives, the paper or paperboard web also includes dispersed microspheres within the fibers and any other components of expanded microspheres.

Expanded and expandable microspheres are well known in the art. See for example Expandable microspheres are described in U.S. Pat. Nos. 6,802,938, 6,864,529, 3,556,934, 5,514,429, 5,125,996, 3,533,908, 3,293,114, 4,483,889, and 4,133,688; and UK Patent Application 2307487, the contents of which are incorporated by reference. All such microspheres can be used in the practice of this invention.

Suitable microspheres include synthetic resinous particles having a generally spherical liquid-containing center. The resinous particles may be made from methyl methacrylate, ethyl methacrylate, ortho-chlorostyrene, polyortho-chlorostyrene, polyvinylbenzyl chloride, acrylonitrile, vinylidene chloride, para-tert-butyl styrene, vinyl acetate, butyl acrylate, styrene, methacrylic acid, vinylbenzyl chloride and combinations of two or more of the foregoing. Preferred resinous particles comprise a polymer containing from about 65 to about 90 percent by weight vinylidene chloride, preferably from about 65 to about 75 percent by weight vinylidene chloride, and from about 35 to about 10 percent by weight acrylonitrile, preferably from about 25 to about 35 percent by weight acrylonitrile.

The amount of microspheres may vary widely and depends on the desired expanded microsphere volume in the final paper product. Preferably the paper includes from about 0.5 to about 5.0 wt % expanded microspheres and more preferably from about 1.0 to about 2.0 wt % by dry weight of the paper or paperboard web.

The paper may include conventional additives such as, for example, starch, mineral fillers, sizing agents, retention aids, and strengthening polymers. Among the fillers that may be used are organic and inorganic pigments such as, by way of example, polymeric particles such as polystyrene latexes and polymethylmethacrylate, and minerals such as calcium carbonate, kaolin, and talc. Other conventional additives include, but are not restricted to, wet strength resins, internal sizes, dry strength resins, alum, fillers, pigments and dyes. For obtaining the highest levels of surface sizing in the processes of this invention, it is preferred that the sheet is internally sized, which means, sizing agents be added to the pulp suspension before it is converted to a paper sheet. Internal sizing helps prevent the surface and sprayed OBA from soaking into the sheet, thus allowing it to remain on the surface where it has maximum effectiveness. The internal sizing agents encompass any of those commonly used at the wet end of a fine paper machine. These include rosin sizes, ketene dimers and multimers, and alkenylsuccinic anhydrides. The internal sizes are generally used at levels of from about 0.05 wt. % to about 0.25 wt. % based on the weight of the dry paper sheet. Methods and materials utilized for internal sizing with rosin are discussed by E. Strazdins in The Sizing of Paper, Second Edition, edited by W. F. Reynolds, Tappi Press, 1989, pages 1-33. Suitable ketene dimers for internal sizing are disclosed in U.S. Pat. No. 4,279,794, which is incorporated by reference in its entirety, and in United Kingdom Patent Nos. 786,543; 903,416; 1,373,788 and 1,533,434, and in European Patent Application Publication No. 0666368 A3. Ketene dimers are commercially available, as Aquapel® and Precis® sizing agents from Hercules Incorporated, Wilmington, Del. Ketene multimers for use in internal sizes are described in: European Patent Application Publication No. 0629741A1, corresponding to U.S. patent application Ser. No. 08/254,813, filed Jun. 6, 1994; European Patent Application Publication No. 0666368A3, corresponding to U.S. patent application Ser. No. 08/192,570, filed Feb. 7, 1994; and U.S. patent application Ser. No. 08/601,113, filed Feb. 16, 1996. Alkenylsuccinic anhydrides for internal sizing are disclosed in U.S. Pat. No. 4,040,900, which is incorporated herein by reference in its entirety, and by C. E. Farley and R. B. Wasser in The Sizing of Paper, Second Edition, edited by W. F. Reynolds, Tappi Press, 1989, pages 51-62. A variety of alkenylsuccinic anhydrides are commercially available from Albemarle Corporation, Baton Rouge, La.

The density, basis weight and caliper of the paperboard web of this invention may vary widely and conventional basis weights, densities and calipers may be employed depending on the paper-based product formed from the web. Paper or paperboard of invention preferably have a final caliper, after calendering of the paper, and any nipping or pressing such as may be associated with subsequent coating of from about 2 mils to about 30 mils although the caliper can be outside of this range if desired. More preferably the caliper is from about 4 mils to about 20 mils, and most preferably from about 7 mils to about 17 mils.

Paper or paperboard substrate of the invention preferably exhibits basis weights of from about 17 lb/3000 $ft^2$ to about 300 lb/3000 $ft^2$, although paper or paperboard substrate basis weight can be outside of this range if desired. More preferably, the basis weight is from about 10 lb/3000 $ft^2$ to about 200 lb/3000 $ft^2$, and most preferably from about 35 lb/3000 $ft^2$ to about 150 lb/3000 $ft^2$.

The final density of the paper or paperboard, which is defined as the basis weight divided by the caliper, is preferably from about 6 lb/3000 $ft^2$/mil to about 14 lb/3000 $ft^2$/mil although paper or paperboard densities can be outside of this range if desired. More preferably, the paper or paperboard density is from about 7 lb/3000 $ft^2$/mil to about 13 lb/3000 $ft^2$/mil and most preferably from about 9 lb/3000 $ft^2$/mil to about 12 lb/3000 $ft^2$/mil.

The paper or paperboard substrate has moisture content of at least 3% and no more than 60%. While I do not wish to be bound by any theory, it is believed that the moisture content is 35%. The moisture content is preferably 30%, more preferably 25% and most preferably 22%.

Substrates employed in the invention are not critical and any cellulose fibers such as paper, paper web, paperboard, and linerboard can be used in the practice of this invention. Useful substrates include a variety of coated and uncoated paper, paperboard and related products, including bleached or unbleached, hardwood or softwood, virgin or recycled, and all coated and uncoated forms of paper made from a variety of chemical, semi-chemical and mechanical pulps such as wood, Kraft, Thermo Mechanical Pulping (TMP), ChemiThermoMechanical Pulping (CTMP), Bleached Chemical Thermomechanical Pulp (BCTMP), and Ground Wood (GW).

Optical brightening agents ("OBAs") used in the practice of the process of this invention may vary widely and any conventional OBA used or which can be used to brighten mechanical or Kraft pulp can be used in the conduct of the process of this invention. Optical brighteners are dye-like fluorescent compounds are substances that absorb light in the invisible ultraviolet region of the spectrum and reemit it in the visible portion of the spectrum, particularly in the blue to blue violet wavelengths. This provides added brightness and can offset the natural yellow cast of a substrate such as paper. Optical brighteners used in the present invention may vary widely and any suitable optical brightener may be used. An overview of such brighteners is to be found, for example, in Ullmann's Encyclopedia of Industrial Chemistry, Sixth Edition, 2000 Electronic Release, OPTICAL BRIGHTENERS—Chemistry of Technical Products which is hereby incorporated, in its entirety, herein by reference. Other useful optical brighteners are described in U.S. Pat. Nos. 5,902,454; 6,723,846; 6,890,454; 5,482,514; 6,893,473; 6,723,846; 6,890,454; 6,426,382; 4,169,810; and 5,902,454 and references cited therein which are all incorporated by reference. Still other useful optical brighteners are described in; and U.S. Pat. Application Publication Nos. US 2004/014910 and US 2003/0013628; and WO 96/00221 and references cited therein which are all incorporated by reference. Illustrative of useful optical brighteners are 4,4'-bis-(triazinylamino)-stilbene-2,2'-disulfonic acids, 4,4'-bis-(triazol-2-yl)stilbene-2, 2'-disulfonic acids, 4,4'-dibenzofuranyl-biphenyls, 4,4'-(diphenyl)-stilbenes, 4,4'-distyryl-biphenyls, 4-phenyl-4'-benzoxazolyl-stilbenes, stilbenyl-naphthotriazoles, 4-styryl-stilbenes, bis-(benzoxazol-2-yl) derivatives, bis-(benzimidazol-2-yl) derivatives, coumarins, pyrazolines, naphthalimides, triazinyl-pyrenes, 2-styryl-benzoxazole or -naphthoxazoles, benzimidazole-benzofurans or oxanilides.

Most commercially available optical brightening agents are based on stilbene, coumarin and pyrazoline chemistries and these are preferred for use in the practice of this invention. More preferred optical brighteners for use in the practice of this invention are optical brighteners typically used in the paper industry based on stilbene chemistry such as 1,3,5-triazinyl derivatives of 4,4'-diaminostilbene-2,2'-disulfonic acid and salts thereof, which may carry additional sulfo groups, as for example at the 2, 4 and/or 6 positions. Most preferred are the commercially available stilbene derivatives as for example those commercially available from Ciba Geigy under the tradename "Tinopal", from Clariant under the tradename "Leucophor", from Lanxess under the tradename "Blankophor", from 3V under the tradename "Optiblanc" such as disulfonate, tetrasulfonate and hexasulfonate stilbene based optical brightening agents. Of these most preferred commercial optical brightening agents, the commercially available disulfonate and tetra sulfonate stilbene based optical brightening agents are more preferred and the commercially available disulfonate stilbene based optical brightening agents is most preferred.

The amount of optical brightener used in the practice of the process of this invention can vary widely and any amount sufficient to provide the desired degree of brightness can be used. In general, the lesser the amount of optical brightener employed the less the enhancement in TAPPI brightness of the final pulp product. Conversely, the greater the amount of optical brightener used the greater the enhancement in pulp brightness except that while we do not wish to be bound by any theory, it is believe that at some point the addition of more optical brightener will not have any further appreciable impact on pulp brightness and may even result in a decrease in pulp brightness. The amount of optical brightener used is usually at least about 1 wgt % based on tons of paper produced. Preferably the amount of optical brightener is from about 0.5 to about 2 wgt %, more preferably from about 0.75 to about 1.75 wgt % and most preferably from about 1 to about 1.5 wgt % on the aforementioned basis.

The amount of the OBA in the aqueous solution can be varied widely and any amount can be used. For example, the amount of OBA can be as high as 50%. The amount of OBA is preferably 25%. More preferably, the amount of OBA in the aqueous solution is from 2-10%. Most preferably, the amount of OBA in the aqueous solution is from 5-10%. It was determined that 2% concentration of OBA is optimum for visual purposes. Subsequent trials modifying optical properties have used higher concentrations of applied chemical. This can be dependent or independent of machine speed. The OBA application weight is generally, but not limited to, 0.7 wt %. More preferably, the application weight of OBA is 1.1 wt %. Most preferably, the basis weight of OBA is 0.9 wt %. The OBA is predominately at or near a surface of the paper or paperboard substrate. For example, the amount of OBA at the surface of the paper or paperboard substrate can greater than 90%.

The aqueous composition may also include various optional components. These components include, but not limited to color bodies or surface properties.

The physical characteristics and properties of these commercially available materials are non-abrasive, non-agglomerating, water soluble and tack free and further described in technical data sheets which are incorporated herein by reference. These include, but are not limited to, dyes, OBA, charge polymers, inorganic salts and surface sizing.

The layer or coating can be applied to the paper using conventional spray fluid application apparatuses. Such apparatuses are noncontacting equipment that is well-known and frequently used in the art of painting and fluid application systems technology. For example, high-pressure spraying equipments with suitable nozzles are commercially available for finishing or coating a surface. These apparatuses are described in detail in SPRAYING SYSTEMS COMPANY.

The paper, paperboard, substrate or linerboard manufactured in accordance with this invention can be used for conventional purposes. For example, the paper is useful as publication paper, packaging and the like. The paper includes a base layer, a starch layer, and an OBA layer sprayed on the starch layer. The paper exhibits superior TAPPI brightness as determined by procedure of T452 OM-98 when compared to the paper used OBA before the size press. The TAPPI brightness of the paper is preferably at least about 75, more preferably from about 84 to about 92 and most preferably from about 92 to about 96.

Figure 1:
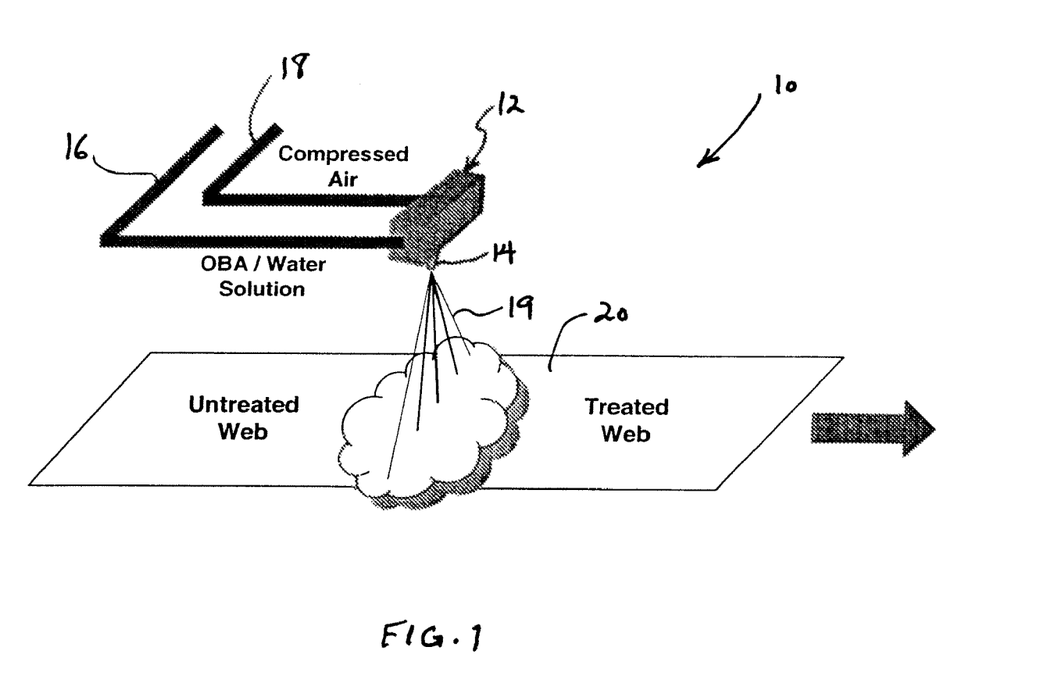
FIG. 1 is a portion of spray coating machine configuration according to the present invention.

FIG. 1 depicts a portion of spray coating machine configuration used in the process of applying OBA to a sheet of paper in accordance to the present invention. The apparatus 10 comprises a mixing chamber 12, at least one nozzle 14, and a pair of tubes 16 and 18. The nozzle 14 and the pair of tubes 16 and 18 are attached to the mixing chamber 12 so that the aqueous composition 19 can be delivered onto the surface of the paper 20. Each of the tubes 16 and 18 are connected to a respective storage tank (not shown). Tube 16 transfers aqueous composition 19 generally, at atmospheric pressure, from the storage tank to the mixing chamber 12. On the other hand, tube 18 transfers compressed air, above atmospheric pressure, to the mixing chamber 12 for atomizing the aqueous composition 19. In the commercial applications, it is preferable to attach multiple spray nozzles to the mixing chamber 12 so that the entire width of the paper 20 can be sprayed with the aqueous composition 19. The function of the nozzle 14 or alternatively, the multiple spray nozzles, is to atomize the ejected aqueous composition 19 jet into an aerosol and then to direct this aerosol to the surface of the paper being coated. Hence, the nozzle must be capable of spraying the aqueous solution in a homogeneous and all-covering manner in order to achieve a high-quality and homogeneous layer of the applied coat. The pressurized aqueous composition 19 is fed into the spray nozzle 14 via a separate duct, and the atomization of the aqueous composition is performed with the help of compressed air passed to the nozzle.

The air atomization of the aqueous composition is preferred because micro particles cover the surface of the paper and allow the human eye to "average" the viewing area and judge the appearance. These micro particles are very small droplets that cover the majority of the surface and make the human eye perceive the majority of the surface as possessing the desired characteristics. Atomization also requires less active agent for comparable results than conventional surface or wet end applications. Also, atomization requires less water to carry aqueous composition onto the paper, and therefore needs less energy to dry the applied layer.

To produce an atomized particle, a collision of air and aqueous solution must happen under controlled circumstances. There were several type of air nozzles experimented with to determine an optimum atomization with lower liquid flow rates and sufficient air pressure for droplet distribution and paper coverage. The two types of spray nozzles used for the present invention are internal and external mixing. The internal mixing nozzle allows the collision to occur inside the apparatus, but the external nozzle collide the air and aqueous solution outside the spray nozzle body. The external nozzle uses higher liquid flows to overcome extraneous forces, and reduces the efficiency of the targeted goal. Although the internal mixing is preferred for the present invention, the external mixing may be used as well.

The fluid delivery can be varied widely in the present invention. For example, the fluid delivery is from 1.4 to 8.4 gallons per hour per nozzle for the development of the apparatus used in the present invention. More preferably, the fluid delivery is from 2.4 to 6.3 gallons per hour per nozzle depending on the OBA concentration. Most preferably, the fluid delivery for the nozzle efficiency was a nozzle delivering approximately 4.1 gallons per hour. These operational conditions enhanced the brightness value and provided the maximum spraying coverage of the sheet of paper.

Air pressure can be varied widely in the present invention. To sufficiently atomize the aqueous solution, the air pressure is from about 20 psi to about 60 psi. More preferably, the air pressure to atomize the aqueous solution is from about 30 psi to about 50 psi. Most preferably, the air pressure to atomize the aqueous solution is from about 40 psi to about 45 psi.

Concentration of OBA can be varied widely. Different dilutions of the aqueous solution may be delivered onto the sheet of paper. Because atomization is such an efficient process for applying OBA to the sheet of paper, very low concentrations of aqueous solution can be used. The dilution rate is ranged from about 1% to about 5% concentration of OBA, diluted in deionized water. More preferably, the dilution rate is ranged from about 2.5% to about 5% concentration of OBA. Most preferably, the dilution is rate ranged from about 3.5% to about 5% concentration of OBA. Depending of coverage area of the sheet of paper and the speed of the paper machine, this may be manipulated.

According to the present invention, an air atomization spray nozzle (Spraying Systems Co. PN 73320.flat) was used to apply a 2% dilute solution of Clariant BCW hexasulfonated optical whitener (mixed with water) to a moving web using compressed air to deliver 4 gallons per hour of the liquid to the nozzle. More preferably, an air atomization spray nozzle was used to apply a 5% dilute solution of Clariant BCW hexasulfonated optical whitener (mixed with water) to a moving web. Most preferably, an air atomization spray nozzle was used to apply a 2% dilute solution of Clariant BCW hexasulfonated optical whitener (mixed with water) to a moving web. The internal mix atomization nozzle uses 40 psi air pressure to cause the sufficient atomization of the solution and adequate coverage of the web. Multiple spray nozzles may be used to set over a larger width web to allow complete web coverage.

For this application, the apparatus is mounted right after the size press and apply the spray solution of OBA to the wet web just prior to entering the dryer. If both sides of the web are to be sprayed, an upper and lower boom may be installed on a paper machine. The dilution of the solution can be modified to assist with sufficient coverage of the web in terms of water addition versus brightness gain. In a mill-type situation, ultra-filtered water and OBA would need to be used to reduce potential plugging of the spray nozzle orifice.

The following specific examples are intended to illustrate the invention in detail and are not intended to be construed as a limitation thereon.

EXAMPLE

A 74 lb basis weight, envelope grade non-fluorescent containing paper web was placed onto the unwind stand of the size press in the paper machine. The paper was fed through the paper machine as typical and wound up on the core at the end of the paper machine. An ethylated starch batch was cooked to 16 percent solids which was diluted to 14 percent in preparation for application onto the paper web. The starch was fed into a puddle pilot size press and the paper web run through the operation to allow all portions of the system to equilibrate. After a few minutes, a 36" by 12" piece of paper web was taken from the paper machine and measured for starch pickup, which was approximately 100 pounds per ton. After target pickup of starch was verified, an atomization spraying nozzle (made by SPRAYING SYSTEMS COMPANY) was placed above the moving paper web and a 2% solution of a hexasulfonated stilbene based OBA obtained from CLORIANT Corporation under the Trade name BCW was sprayed on the paper web. The OBA solution was delivered with a canister using pressurized air to leverage displacement of the fluid to the nozzle. By controlling the air pressure to 40 psi, the volume of flow could be controlled to optimum delivery rates. In some experiments, hexasulfonated stilbene OBA was then added to the starch batch after spraying OBA onto a moving paper web surface with wet starch as a comparison data point. The spray nozzle was turned off, and then a 4 percent amount of hexasulfonated stilbene OBA, as received, was added to the starch batch, based on weight. Once the starch application system with OBA was equilibrated, another sample was taken of the paper web and measured to verify target starch pickup of approximately 100 psi. This procedure of adding 4 percent OBA was done as a control to mimic typical OBA application in a paper mill. One final trial parameter was examined where both conditions of OBA was applied in the starch, as typical, as well as OBA sprayed onto the surface. The Tappi brightness of the sheets was measured using the procedure of TAPPI T452 OM-98. Process parameters and the results of the Tappi brightness evaluations are set for the in the following Table I.

TABLE I

Internal Mix Atomization Spray Nozzle - No. 73320.flat

| Run # | I1 Size press Starch Applied | I2 OBA in Starch Content | I3 Spray Parameters Air(psi) | I4 Fluid(psi) | I5 OBA in Starch Content | I6 General Comments |
|---|---|---|---|---|---|---|
| 0 | no | — | — | — | None | Base control w/o heat |
| 1 | no | — | — | — | None | Base control w/heat |
| 2 | yes | None | — | — | None | Base control w/starch only |
| 3 | yes | None | 12 | 10 | 2% Hexasulfonated | 2.17 gph/side spray |
| 4 | yes | None | 20 | 20 | 2% Hexasulfonated | 3.35 gph/side spray |
| 5 | yes | None | 42 | 40 | 2% Hexasulfonated | 4.14 gph/side |
| 6 | yes | None | 65 | 50 | 2% Hexasulfonated | 3.02 gph/side spray |
| 7 | yes | 4% Hexasulfonated | — | — | None | OBA control |

TABLE I-continued

Internal Mix Atomization Spray Nozzle - No. 73320.flat

| 8  | yes | 4% Hexasulfonated | 12 | 10 | 2% Hexasulfonated | 2.17 gph/side spray |
| 9  | yes | 4% Hexasulfonated | 20 | 20 | 2% Hexasulfonated | 3.35 gph/side spray |
| 10 | yes | 4% Hexasulfonated | 42 | 40 | 2% Hexasulfonated | 4.14 gph/side spray |
| 11 | yes | 4% Hexasulfonated | 65 | 50 | 2% Hexasulfonated | 3.02 gph/side spray |

| Run # | I7 Size press OBA (#/T) | I9 Spray OBA (#/T) | I12 Avg. TAPPI Brightness | I13 Brightness Gain | I14 Brightness unit gain per OBA pound |
|---|---|---|---|---|---|
| 0  | —    | —    | 78.9 | —   | —     |
| 1  | —    | —    | 78.9 | 0   | —     |
| 2  | 0.0  | 0.0  | 77.9 | −1  | 0.000 |
| 3  | 0.0  | 14.3 | 80.4 | 1.5 | 0.105 |
| 4  | 0.0  | 22.1 | 82.6 | 3.7 | 0.167 |
| 5  | 0.0  | 27.3 | 82.8 | 3.9 | 0.143 |
| 6  | 0.0  | 19.9 | 82.2 | 3.3 | 0.166 |
| 7  | 38.4 | 0.0  | 83.1 | 4.2 | 0.109 |
| 8  | 38.4 | 14.3 | 83.7 | 4.8 | 0.091 |
| 9  | 38.4 | 22.1 | 83.6 | 4.7 | 0.078 |
| 10 | 38.4 | 27.3 | 83.6 | 4.7 | 0.071 |
| 11 | 38.4 | 19.9 | 83.8 | 4.9 | 0.084 |

Table I has numeric labels for the runs and alpha-numeric labels for each parameter and test condition. Starting with the runs, labeled 0 through 11 on the internal and 12 through 17 on the external mix spray nozzles, each number specifies a run condition. Run number 0 is the primary control; no heat, no starch, and no OBA applied to the sheet, either sprayed or with starch as a carrier. Run number 1 is a secondary control where the just the paper was run through the machine drying system with no starch and no OBA applied. Run number 2 is a basic control where only starch is applied to the web along with heat to dry it. This is used as the baseline for comparison to determine how much brightness can be built on the sheet with OBA applied; either sprayed with both types; internal and external mix, and added into the starch. The internal mix spray apparatus (top chart) had better coverage with lower flow rates, so it will be referenced for the remainder of this text. Runs 3 through 6 all had OBA applied via spray to the surface of the sheet, but had no OBA mixed in the starch solution. The variable within these runs was the amount of OBA-containing spray applied to the surface. Column 16 shows the spray flow amounts of a 2% solution of OBA and water, used as a carrier. For the spray nozzle to work properly, air and fluid flow pressure has to be monitored and properly delivered to the spray head to efficiently cover the web. These parameters are identified in columns 13 and 14.

Overall, these series of runs were to determine at what point spray application fluorescence would compare to a typical OBA-mix starch solution. This can be calculated by measuring the sheet containing optical whitener for brightness and comparing to the sheet with only starch. Run number 7 (highlighted), was used as standard for comparison because it is the typical application amount of OBA in starch at paper mills. Looking at comparable brightness builds, run number 5 (also highlighted) was the closest in brightness builds. When calculations are made for the amount of OBA applied in each method to gain comparable brightness, column I11 shows the spray application method exhibits a significant savings over traditional size press (starch containing) application methods for comparable brightness gains.

The several paper samples of runs in Table I were evaluated for fade. Fading of the paper typically results in loss of brightness and/or fluorescence, as well as color change. The test samples were; a control of the paper with no starch (A), a sample of the paper with only starch, no OBA (2), the optimum spray condition previously discussed (5), the typical OBA addition in starch, also mentioned previously (7). Also added to the testing was a combination of spray and starch applied optical whitener, for investigation purposes (10). Two commercial production sheets, sample P1 and P2 were evaluated for comparison purpose in the Table II.

The initial sheet brightness for all test sheets is approximately 84. The sheets were irradiated at 1.0 watt/$m^2$ @ 420 nm with xenon light source simulating indoor light for 0, 2, 4, 7 and 10 hours inside an ATLAS weatherometer and tested for TAPPI brightness and fluorescence. The humidity and the temperature for the test are 45% and 30 C. The results are set forth in Table II and in FIGS. 2, 3, 4 and 5.

TABLE II

Internal Mix Nozzle 73320.flat

| Run # | W1 Size press Starch Applied | W2 OBA in Starch Content | W3 W4 Spray Parameters | | W5 OBA in Starch Content | W6 General Comments | W7 W8 W9 W10 W11 Exposure time (hours) vs. TAPPI Brightness measurement | | | | | W13 W14 W15 W16 W17 Exposure time (hours) vs. Fluorescence measurement | | | | |
|---|---|---|---|---|---|---|---|---|---|---|---|---|---|---|---|---|
| | | | Air (psi) | Fluid (psi) | | | 0 | 2 | 4 | 7 | 10 | 0 | 2 | 4 | 7 | 10 |
| A | no | — | — | — | None | Sheet w/no starch, no OBA | 78.9 | 79.2 | 79.3 | 79.8 | 79.6 | 0 | 0 | 0 | 0 | 0 |
| 2 | yes | None | — | — | None | Sheet w/starch, no OBA | 77.9 | 78.2 | 78.5 | 78.7 | 79.3 | 0 | 0 | 0 | 0 | 0 |

TABLE II-continued

Internal Mix Nozzle 73320.flat

| Run # | W1 Size press Starch Applied | W2 OBA in Starch Content | W3 Spray Parameters Air (psi) | W4 Fluid (psi) | W5 OBA in Starch Content | W6 General Comments | W7 0 | W8 2 | W9 4 | W10 7 | W11 10 | W13 0 | W14 2 | W15 4 | W16 7 | W17 10 |
|---|---|---|---|---|---|---|---|---|---|---|---|---|---|---|---|---|
| | | | | | | | \multicolumn{5}{|c|}{TAPPI Brightness measurement} | \multicolumn{5}{|c|}{Fluorescence measurement} | | | | |
| 5 | yes | None | 42 | 40 | 2% Hexasulfonated | Sheet w/starch, spray OBA | 82.7 | 82.8 | 83.2 | 83.2 | 82.8 | 5.0 | 5.5 | 5.2 | 4.9 | 4.7 |
| 7 | yes | 4% Hexasulfonated | — | — | no | Sheet w/starch, size press OBA | 83.4 | 83.2 | 83.1 | 83.0 | 82.9 | 5.6 | 5.1 | 4.9 | 4.7 | 4.4 |
| 10 | yes | 4% Hexasulfonated | 42 | 40 | 2% Hexasulfonated | Sheet w/starch, size press & spray OBA | 84.3 | 83.8 | 83.5 | 83.6 | 83.4 | 6.9 | 6.5 | 6.2 | 6.0 | 5.8 |
| P1 | — | — | — | — | — | Typical Production Control (84 Bright) | 84.0 | 83.3 | 83.5 | 83.7 | 83.6 | 2.6 | 2.3 | 2.2 | 2.2 | 2.0 |
| P2 | — | — | — | — | — | Typical Production Control (84 Bright) | 83.5 | 82.3 | 82.2 | 82.3 | 82.6 | 2.3 | 2.1 | 1.9 | 1.8 | 1.7 |

Figure 2:
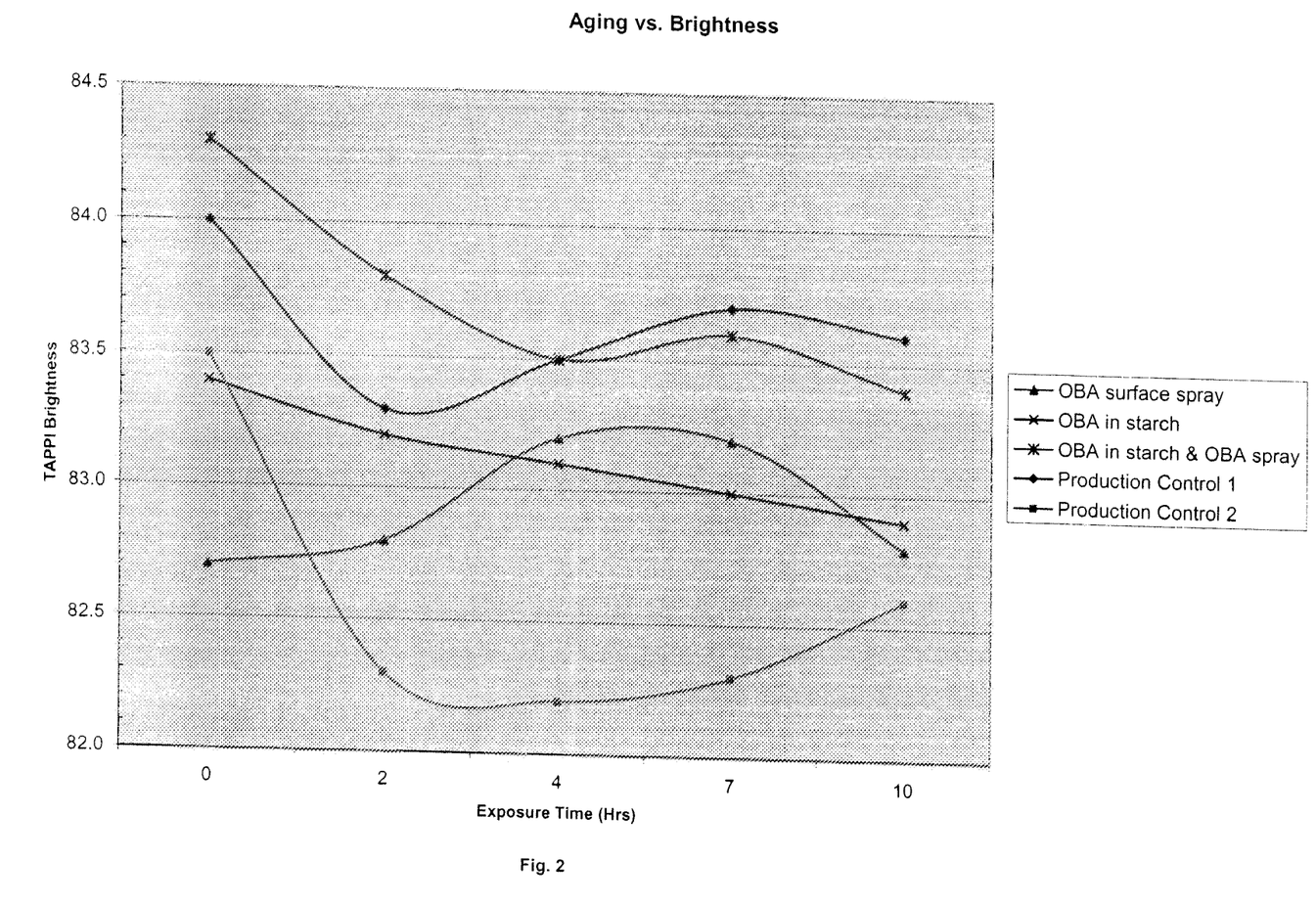
FIG. 2 is a graphic illustration of the paper brightness variation from the unexposed samples with exposure time.
Figure 3:
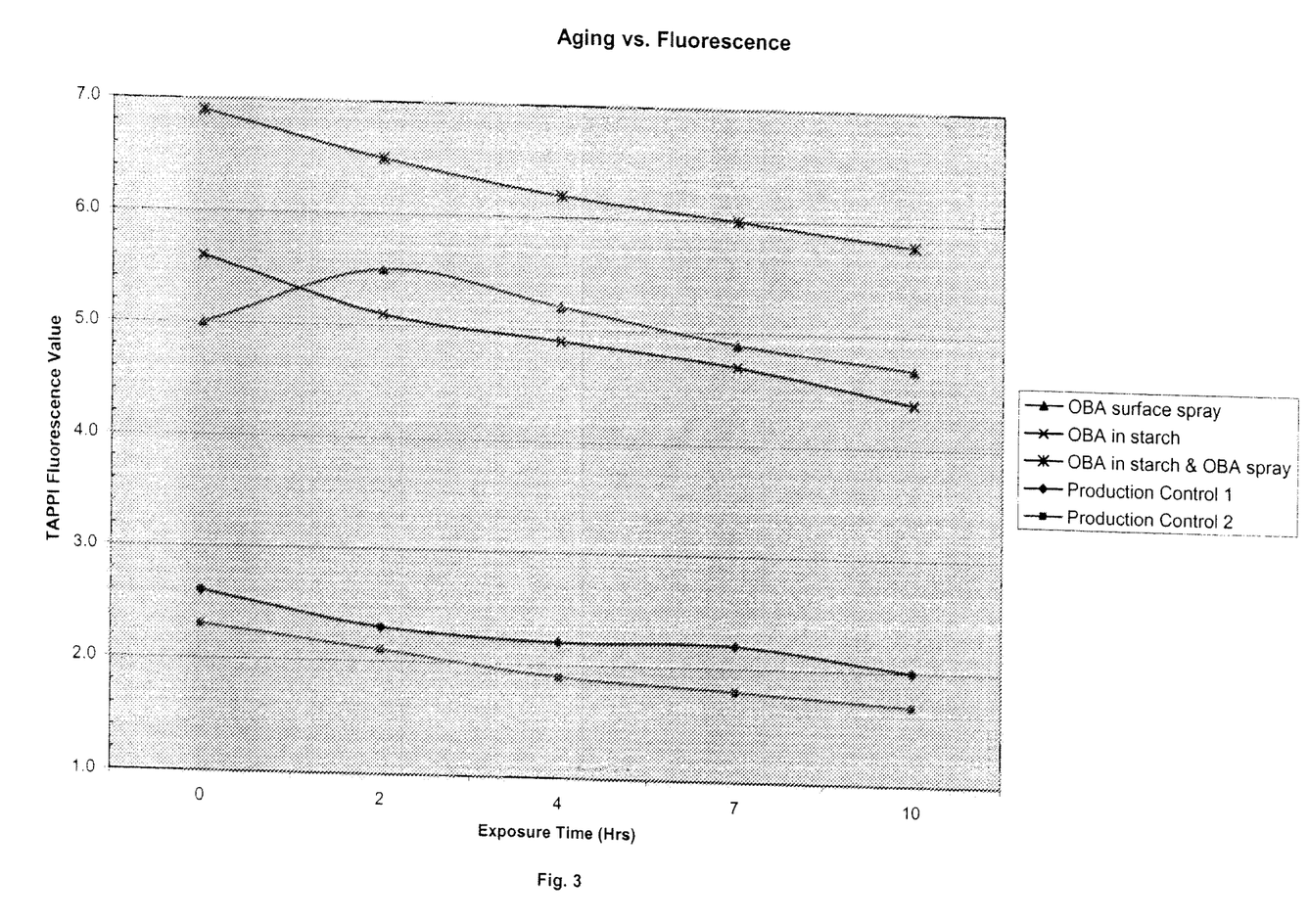
FIG. 3 is a graphic illustration of the result of paper brightness values change as a function of exposure time.
Figure 4:
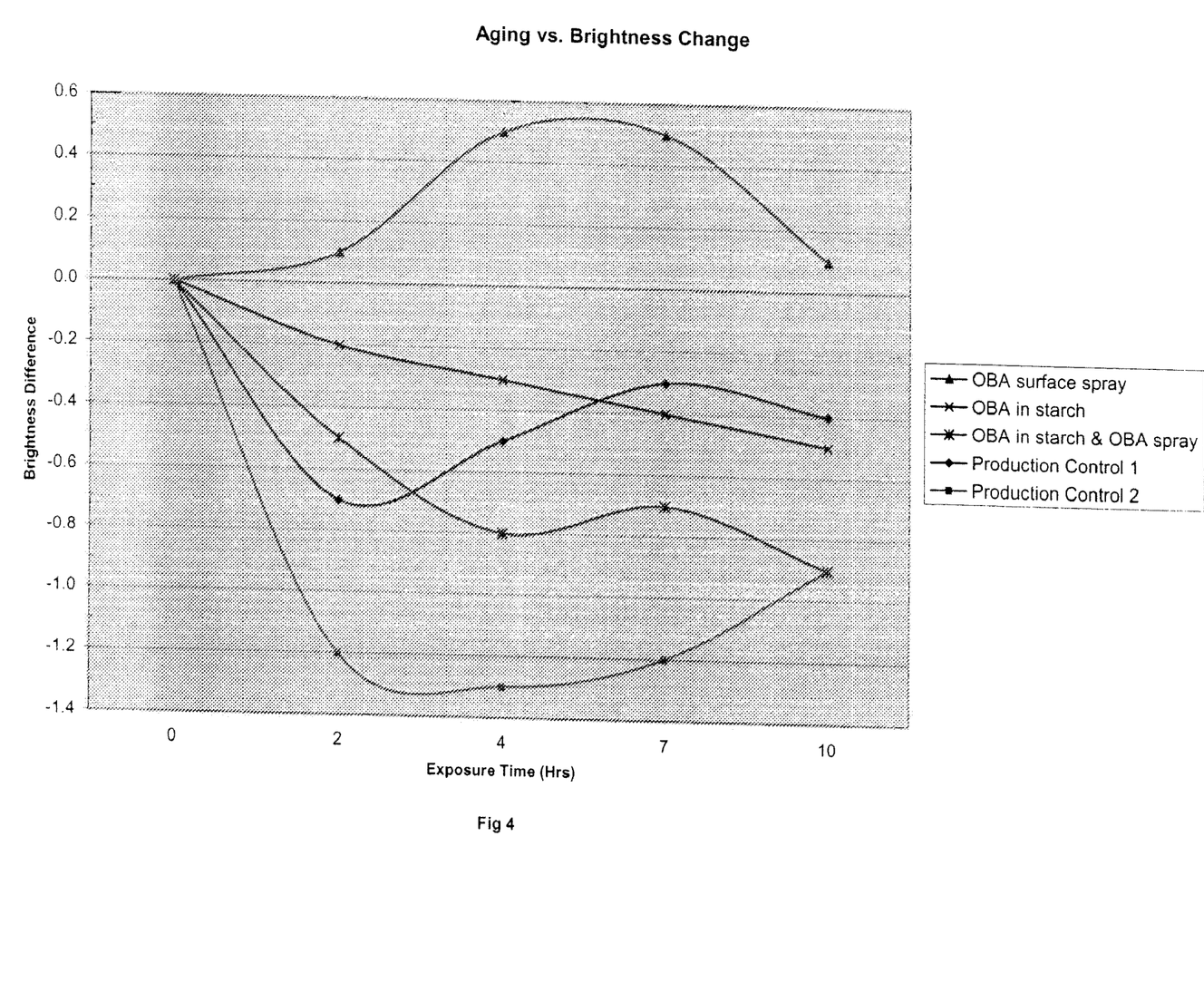
FIG. 4 is a graphic illustration of the effect of measured fluorescence as a function of exposure time.
Figure 5:
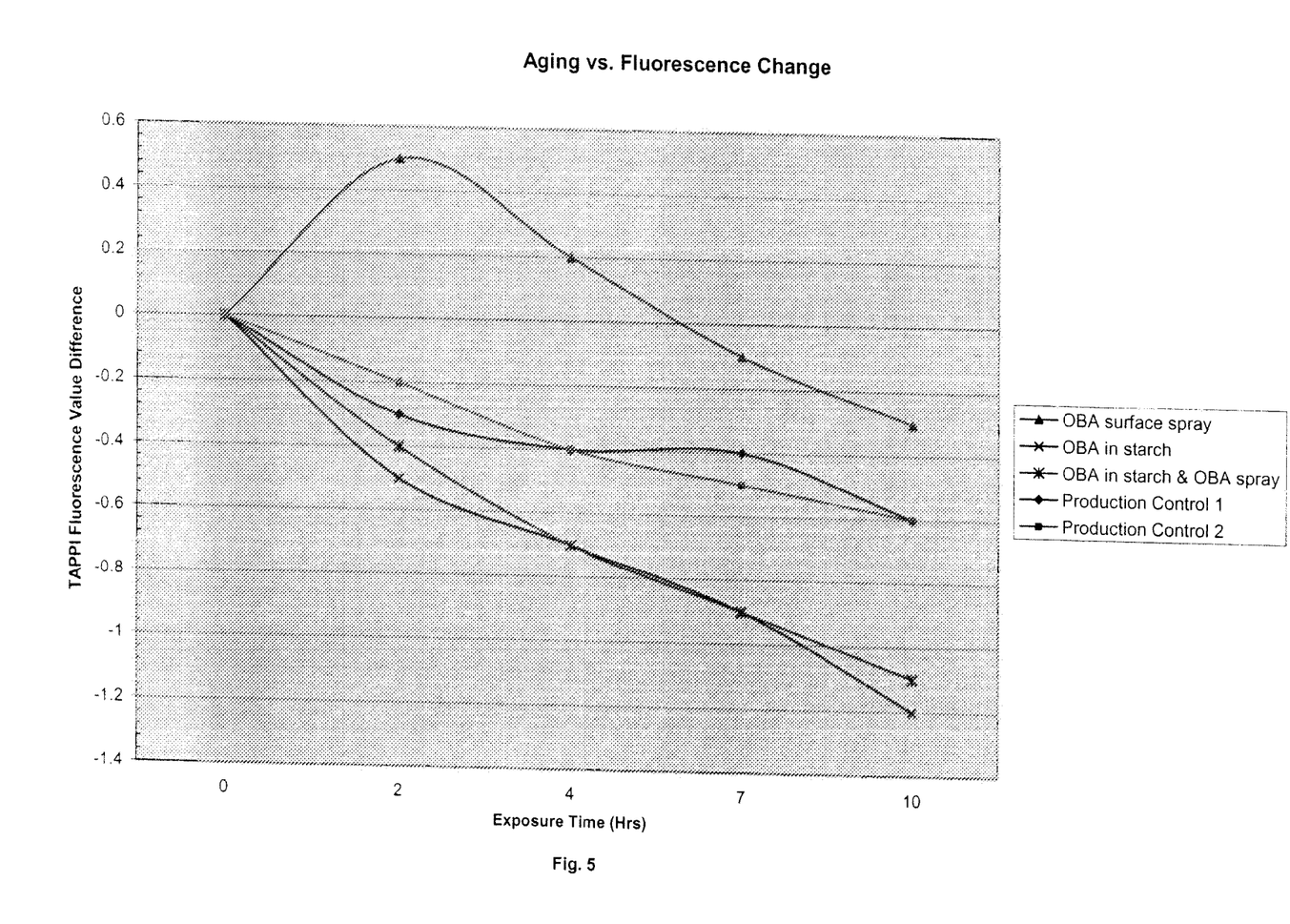
FIG. 5 is a graphic illustration of the fluorescence variation from the unexposed samples with exposure time.

As shown in Table II, all test samples are labeled by run number and test condition for illustration purposes. FIG. 2 shows the result of sheet brightness versus exposure time. FIG. 4 plots the change from the unexposed control against time. FIG. 3 shows the effect on measured fluorescence versus time. FIG. 5 shows the variation from the unexposed samples with exposure time. FIGS. 2 and 3 show the testing results of fade on TAPPI brightness. FIGS. 4 and 5 the fade results on fluorescence. In FIG. 1 each test parameter shows the absolute values and the following chart display the change from the non exposed sample. All values in the FIG. 2 are plotted against exposure time.

Various modifications and variations may be devised given the above-described embodiments of the invention. It is intended that all embodiments and modifications and variations thereof be included within the scope of the invention as it is defined in the following claims.

The invention claimed is:

1. A process for applying optical brightening agent to a sized paper or paperboard substrate, the process comprising: spraying an aqueous composition comprising an optical brightening agent (OBA) directly onto at least one surface of the sized paper or paperboard substrate having a surface TAPPI brightness of (x) to form a treated sized paper or paperboard substrate having a layer of OBA on the at least one surface of the sized paper or paperboard substrate having a surface TAPPI brightness of (y), wherein (y) is greater than (x).

2. The process of claim 1 wherein the treated paper or paperboard substrate consists of a layer of base stock, a layer of starch sizing on a surface of the base stock, and the layer of OBA.

3. The process of claim 1 wherein the aqueous composition comprises less than about 2 wt % of OBA based on the total weight of the aqueous composition.

4. The process of claim 1 wherein the optical brightening agent on the surface of the treated sized paper or substrate is in amount from about 0.1 wt % to about 2 wt % per ton of total weight of paper or paperboard substrate.

5. The process of claim 1 wherein the aqueous composition is sprayed using a plurality of spray nozzles arrayed to extend across a width of the sized paper or paperboard substrate.

6. The process of claim 5 wherein a distance between the spraying nozzle and the paper or paperboard substrate is from 10 mm to 200 mm.

7. The process of claim 1 wherein the aqueous composition is atomized.

8. The process of claim 7 wherein the aqueous composition is atomized by mixing with a stream of air under pressure before being applied onto the surface of the paper or paperboard substrate.

9. The process of claim 8 wherein the pressure of air ranges from about 10 psi to about 60 psi.

10. The process of claim 1 wherein the aqueous composition is supplied to the spraying nozzles at pressure from about 10 psi to about 60 psi.

11. The process of claim 1 wherein the paperboard substrate is lightweight base stock in range of about 10 lbs/3300 ft$^2$ to about 300 lbs/3300 ft$^2$.

12. The process of claim 1 wherein the spraying comprises the steps of introducing the aqueous composition into a mixing chamber having multiple spray nozzles thereon and wherein the mixing chamber configured to be extending across a width of the moving paper or paperboard substrate; and dispersing the aqueous composition from the mixing chamber onto the one surface of the moving paper or paperboard substrate wherein the mixing chamber is positioned proximate the one surface of the moving paper or paperboard substrate.

13. The process of claim 1 wherein the OBA is applied to the paperboard substrate after the size press and before the reel operation.

14. The process of claim 1 wherein the OBA is applied to the moving sized paperboard substrate in amount of about 15 lbs of OBA per ton of paperboard.

15. The process of claim 1 wherein forming the treated surface of the paperboard substrate reduces the usage of OBA by at least 30% while maintaining or improving optical properties of the web of the paper.

* * * * *